United States Patent Office 3,181,455
Patented May 4, 1965

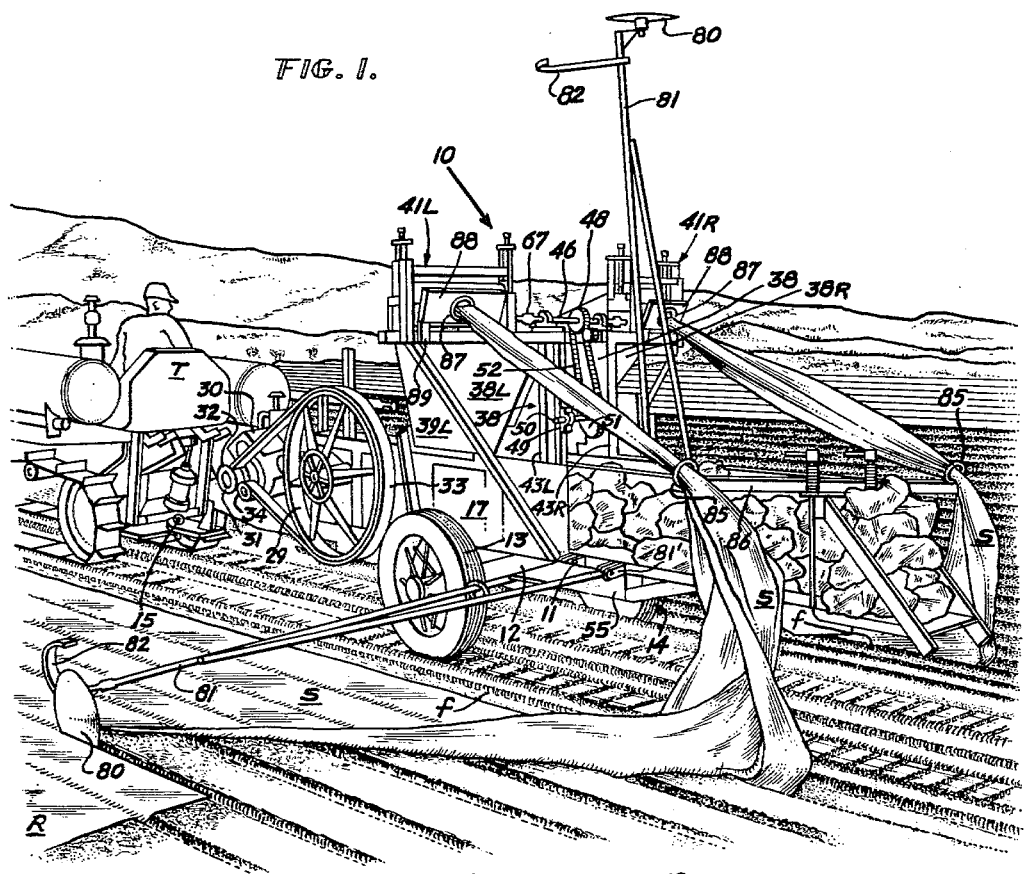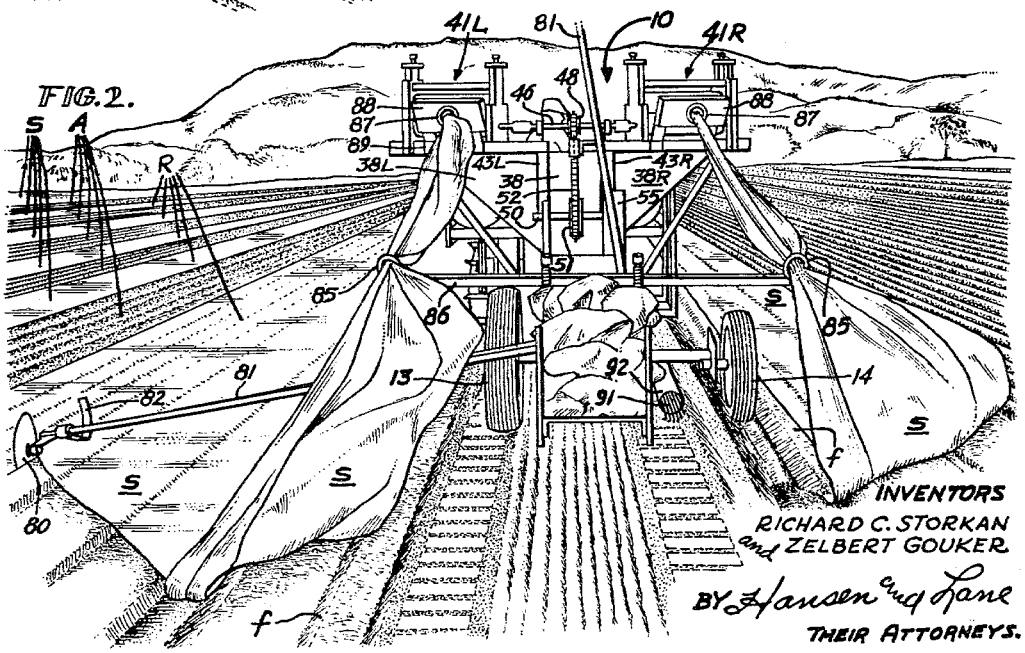

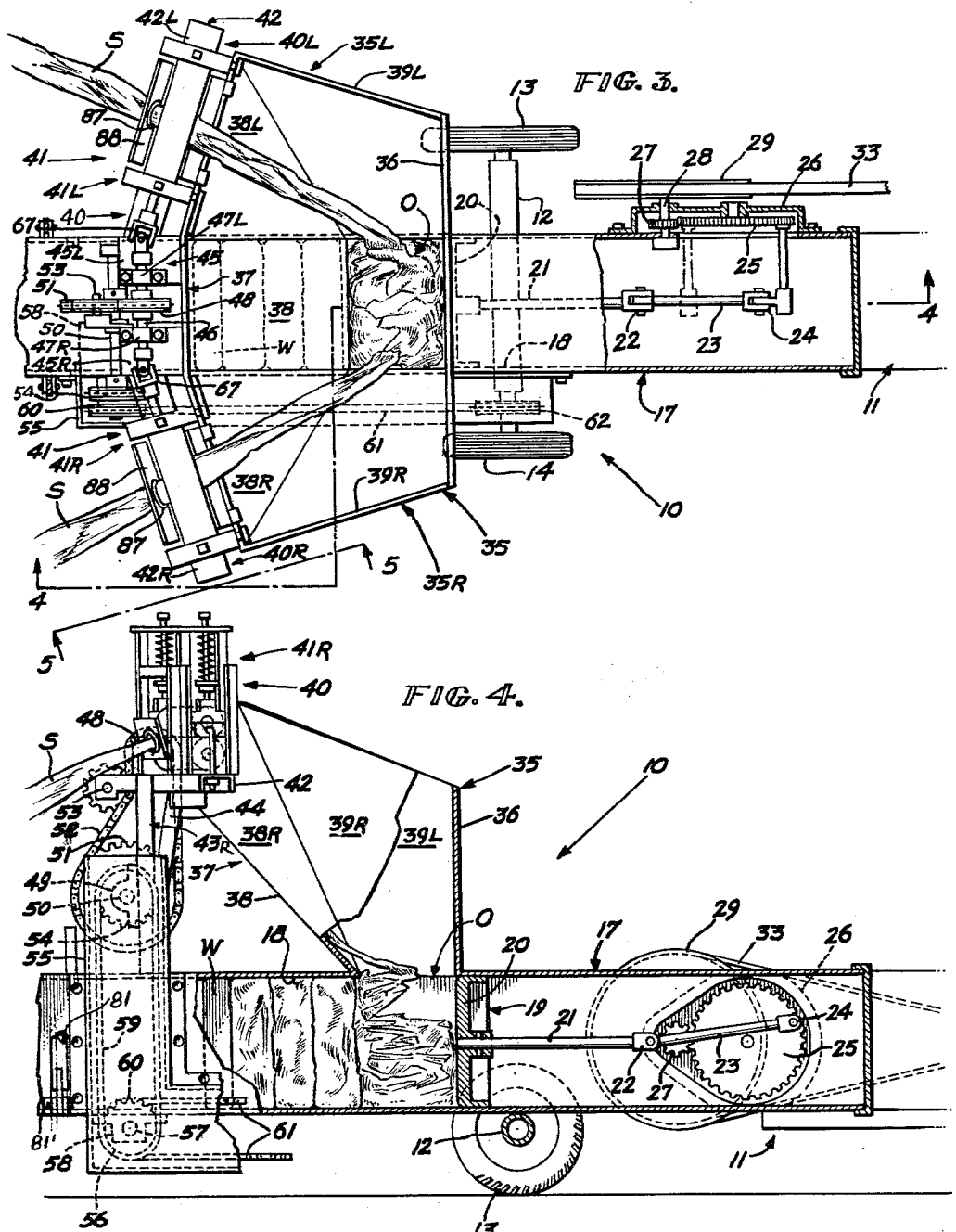

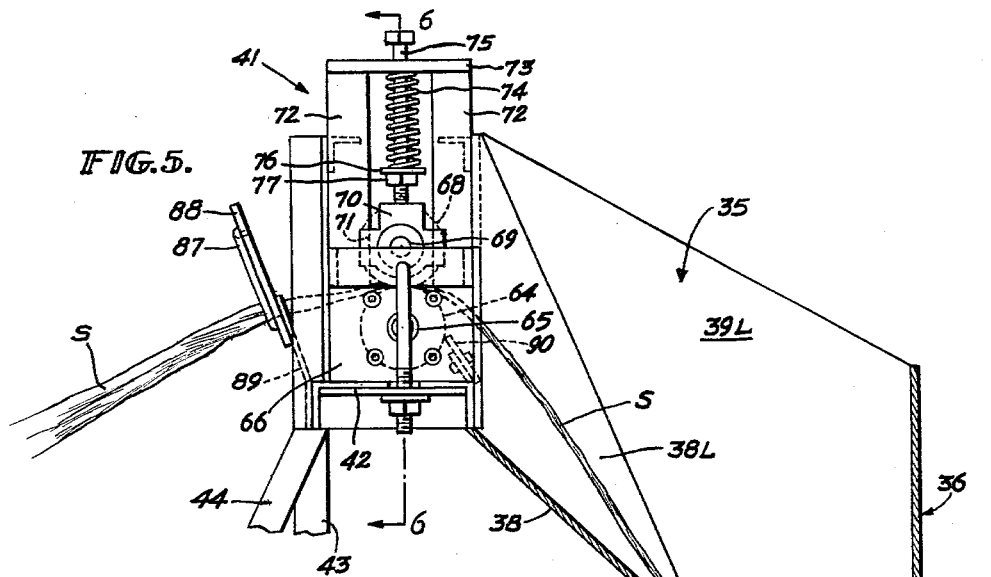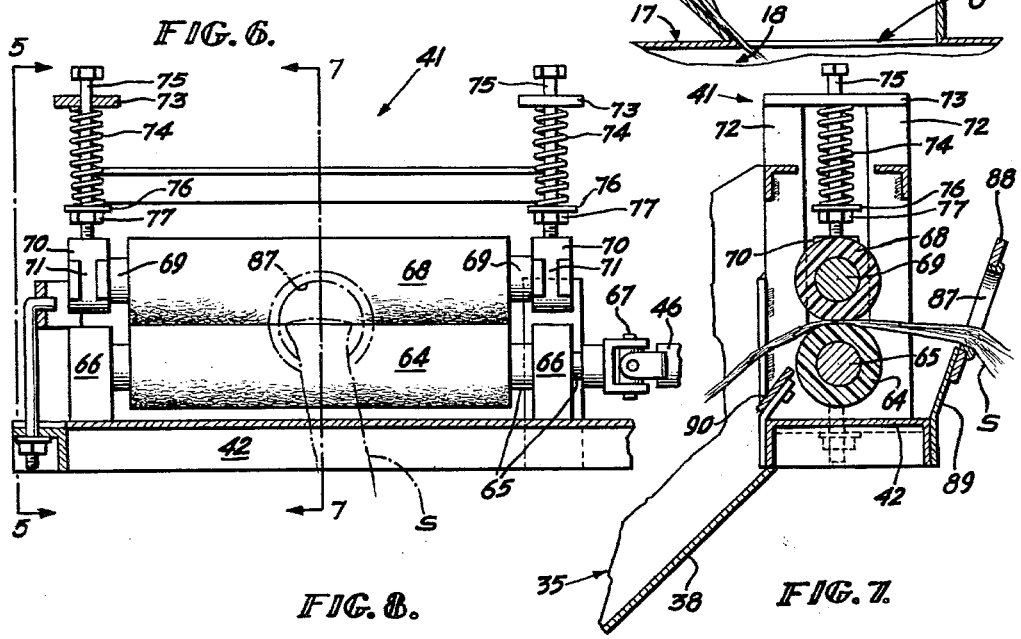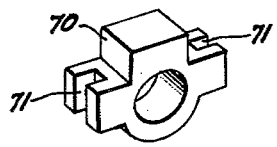

3,181,455
APPARATUS FOR GATHERING PLIOFILM SHEETING FROM A FIELD
Zelbert Gouker, Watsonville, Calif., and Richard C. Storkan, 112 Robin Way, Los Gatos, Calif.; said Gouker assignor to said Storkan
Filed Apr. 21, 1964, Ser. No. 361,401
7 Claims. (Cl. 100—97)

This invention relates to apparatus for gathering sheet material and more particularly to apparatus for gathering Pliofilm and for compacting the same for disposal.

The problem arises out of the extensive use of Pliofilm sheets as an impervious air tight cover for disinfecting earth in fields prior to planting. Insects, pestilence, seed and fungus are not always killed off annually by deep frosts during a dormant period. Consequently such infectuous matter in the soil tends to propagate without respect to seasons. It has therefore become a practice to fumigate the soil for a brief period for the dual purpose of killing off such pestilence as well as killing weeds and their seed. In this manner future crops are protected against the attack of such insects and fungus and weeding is minimized until such time as another treatment is required.

Fumigation of the soil is accomplished by spreading chemical weed killers and pesticides over a newly plowed and disked field. For best results it has been the practice to cover the fumigated soil with large sheets of polyethylene. These sheets are usually up to 16 feet in width and come in rolls of several thousand feet in length. As illustrated in FIGS. 1 and 2 of the accompanying drawings these sheets are laid over alternate rows leaving intermediate runways over which equipment can be moved to turn a furrow of loose soil over the edges of the cover sheets to hold them down and to seal in the toxic gases generated by the chemical fumigants and the soil.

Until the advent of the present invention it was an almost impossible task to remove the Pliofilm sheets from a field. The weight of the earth upon the edges of the sheets rendered it a mammoth task to pull the sheets out of this anchorage. Such furrows of soil had to be removed. Moreover when the wind catches under the sheets they, being non porous, would flay and be blown about. Furthermore, in gathering the sheets by hand large masses of loose bundles of Pliofilm required numerous open rigs to provide the space for the large volume of sheeting and to carry them off. Furthermore, disposal of such loose bundles of such sheets became a problem since they will not rot and to burn or bury them required large burning areas.

It is an object of the present invention to provide an apparatus for removing Pliofilm sheets from fields and to press such sheets into compact bales for removal and disposal.

It is another object of this invention to provide a tractor drawn apparatus into which one end of such sheets can be fed for automatic removal from the field in timed relation with the movement of the apparatus along the field.

It is another object to provide on such apparatus means for severing the sheets longitudinally concurrent with the removal of the sheets from the field. By this arrangement narrower widths of the sheeting facilitates easier handling and both sides of the apparatus can be used to gather the half sheets simultaneously.

It is another object to provide a gathering apparatus by which the sheets are initially trained into a continuous long narrow loose strand, then into a more compacted strand and ultimately into a flat strand foldable into a pile. By this arrangement the sheet material is gathered into a condition in which it cannot be blown about. Moreover, the flat strands are compacted and semi-solid so as to move by gravity toward a press.

It is another object of the present invention to provide a puller for each length of sheeting operable in timed relation with the movement of the apparatus along the field whereby the sheet material is pulled from the furrow anchorage and directly gathered up into a hopper. The pullers while serving the foregoing purpose simultaneously serve to flatten the gradually compacted strands so that the flat strands continuously feed into the hopper in timed relation to the removal of the sheets from the field.

It is a still further object to provide a baler operable in combination with the pullers of the gatherer so that as a predetermined quantity of the flattened strands discharge from the hopper such strands pile up neatly before a ram by which each such quantity or pile of sheeting is immediately compressed into a bundle for baling and ultimate removal from the field.

These and other objects and advantages of the present invention will become apparent from a reading of the following description and claims in the light of the accompanying three sheets of drawings in which:

FIG. 1 is a perspective view as seen from a left rear angle of the sheet gathering apparatus of the present invention illustrated in the use of removing sheets of Pliofilm from a field.

FIG. 2 is a rear perspective view of the apparatus illustrated in FIG. 1.

FIG. 3 is a top plan view of the sheet gathering apparatus shown in FIGS. 1 and 2.

FIG. 4 is a longitudinal section through FIG. 3 taken substantially along line 4—4 of FIG. 3 to show partial elevation of FIG. 3.

FIG. 5 is a side elevation of a portion of FIG. 3 as seen from line 5—5 thereof.

FIG. 6 is a vertical section through FIG. 5 taken along line 6—6 thereof.

FIG. 7 is a vertical cross section through FIG. 6 taken along line 7—7 thereof.

FIG. 8 is a perspective view of a floating bearing embodied in the present invention.

Referring first to FIGS. 1 and 2 it will be noted that the sheets of Pliofilm S have been neatly laid over alternate rows R conforming to the width of each sheet. The standard width of such sheets at present is 11 or 13 feet. The space A between alternate rows is left uncovered for a width sufficient to accommodate the gauge width of a conventional tractor T and/or other wheeled vehicles, such as the apparatus 10 embodying the present invention. The sheets S are anchored and sealed along their edges adjacent the space A by a furrow of earth indicated $f$ in FIGS. 1 and 2. It will thus be noted that neither the tractor pads nor the wheels of the apparatus 10 roll over the sheets S or the furrows $f$ along the edges thereof.

The apparatus 10 includes a chassis 11 mounted on an axle 12 having wheels 13 and 14 at its ends on either side of the chassis. The fore end of the chassis is provided with a conventional trailer hitch 15 by which it is releasably connected to the aft end of the tractor T in a well known manner.

A baler 17 is mounted on the chassis 11 so as to extend longitudinally in a fore to aft direction thereof. The baler 17 includes a packing chamber 18 of substantially square cross section and having a ram 19 reciprocable within the chamber 18 for packing material toward the aft end thereof. The ram 19 is a piston like plate 20 which fits within the chamber for fore and aft movement therein. The piston 20 is secured to the aft end of a rod 21 the fore end of which is pivotally connected as at 22 to a connecting rod 23 which in turn has its fore end pivotally connected eccentrically as at 24 to a large gear 25. The gear 25 is pivotally mounted in a gear housing 26 and meshes with a small gear 27 also within the housing. The small gear 27 is secured to a shaft 28 the outer end of which has a large pulley 29 secured thereto at one side of the baler 17.

A self contained engine 30 is mounted on the fore end of the chassis 11. The engine 30 has a drive shaft 31 extending transverse to the chassis 11 and provided with a small pulley 32 in fore to aft alignment with the large pulley 29 on the baler. A belt 33 is trained around the pulleys 29 and 32 and a suitable belt tensioning pulley 34 engaging the belt is rockably mounted on one side of the chassis for tensioning the belt 33 for drivingly connecting the pulley 32 with the large pulley 29 to cause the piston 20 to reciprocate within the chamber 18. Suitable control rods (not shown) between the baler 17 and the tractor T and accessible to the driver thereof affords manual control of the rockable tensioning pulley 34 for releasing the belt 33 to stop reciprocation of the piston 20 when required.

The stroke of the piston 20 is substantially equal to the height or width of the chamber 18 so that upon each movement of the piston from a fore to an aft limit any material confronted by the piston will be forced rearwardly in the chamber 18.

A hopper 35 is mounted on top of the chamber portion of the baler and has an open bottom O communicating with the chamber 18 in the region of reciprocation of the piston 20 therein (see FIG. 4). As best seen in FIG. 3 the hopper 35 extends across the baler 17 and has diverging half hopper zones 35R and 35L which project laterally above the right and left sides of the relatively narrow baler 17. For this reason the hopper 35 has a front wall 36 which is mounted on the baler 17 to extend vertically upward therefrom. The front wall 36 is preferably, though not necessarily, about three times the width of the baler so that the fore end of each half hopper 35R and 35L is about the same width laterally as the open bottom of the entire hopper 35.

The back wall 37 of the hopper 35 includes a medial portion 38 and a pair of left and right rear wall sections 38L and 38R for each of the respective half hoppers 35L and 35R. Each of these left and right rear wall sections 38L and 38R is at a slight forwardly angular disposition relative to the medial portion 38 of the back wall 37 and extend beyond the baler 17 a distance greater than does the front wall 36. The side walls 39R and 39L of the hopper 35 are at right angles to the rear wall sections 38R and 38L and extend forwardly in a converging fashion to the extreme ends of the front wall 36.

Each of the sections 38, 38R and 38L of the back wall 37 as well as the side walls 39R and 39L slant downwardly and terminate at the back and side limits of the open bottom O of the hopper 35 to feed material toward the latter.

To the rear of the back wall 37, and quite closely adjacent the same, is a framework 40 for a pair of sheet pulling units 41, one 41L adjacent the left section 38L and the other 41R adjacent the right section 38R of the back wall 37. The framework 40 includes a pair of brackets 40L and 40R each identical in construction as are the pulling units 41L and 41R so that only one will now be described, like reference numerals being applied to like parts of the other.

The bracket 40L or 40R includes a channel member 42 which is horizontally disposed in inverted condition with its fore edge connected to the aft edge of the section 38L or 38R of the back wall 37 of the hopper, as the case may be (see FIGS. 5 and 7). The inner end of the channel member 42 is supported on an upright channel member 43 which has its lower end secured to the chassis 11 along one side of the baler 17 and its upper end welded to the channel member 42. A diagonal brace 44 has its lower end secured to the chassis 11 and its upper end welded to the channel member 42 near the outer end thereof.

Thus it will be seen (FIGS. 1 and 2) that the two upright channel members 43L and 43R are spaced from each other centrally of the apparatus 10.

A pair of shelf plates 45L and 45R, each secured to the inner end of the adjacent horizontal channel member 42L and 42R, respectively, provides a central platform 45 for a cross shaft 46. The cross shaft 46 is journaled in bearings 47R and 47L, one on each of the respective shelf plates 45R and 45L and secured thereto by suitable bolts. The bearings 47R and 47L are spaced from each other as are the inner ends of the shelf plates 45R and 45L to accommodate a sprocket 48 which is secured to the cross shaft 46 centrally of the apparatus.

Each of the upright channel members 43 has a bearing 49 secured to its after face about half way between the baler 17 and the platform 45. A countershaft 50 is journaled in the bearings 49 and has a large sprocket 51 secured thereto vertically below the sprocket 48 on the cross shaft 46. A chain 52 is trained around the sprockets 48 and 51 and has an idler sprocket engaging one of its reaches to maintain proper tension on the chain 52. The idler sprocket is mounted on a stud pin 53 extending inwardly from one of the uprights (43R FIGS. 2 and 4).

A sprocket 54 is secured to one end of the countershaft 50 within a guard 55 adjacent the right hand upright channel 43R. Below this sprocket 54 is another 56 secured to one end of a cross shaft 57 suitably supported on bearings 58 secured to the chassis 11 below the baler 17. A chain 59 is trained around these two sprockets 54 and 56. The other end of the lower cross shaft 57 has a sprocket 60 secured thereto and drivingly connected by a chain 61 to a sprocket 62 secured to the axle 12 of the apparatus 10 or at least to one wheel 14 thereof. In this manner the several sprockets and interim shafts are turned as is the upper cross shaft 46 in timed relation with the movement of the apparatus 10 along the field.

The pulling units 41L and 41R have driving connection with the cross shaft 46. Each of these units comprises a pair of rollers, the lower one 64 of which is mounted on a shaft 65 journaled on fixed bearings 66 in horizontal alignment with the cross shaft 46. The bearings 66 are mounted on the channel member 42 to support the shaft 65 parallel thereto and at an angle to the cross shaft 46. The inner end of the roller shaft 65 is connected to the cross shaft 46 via a universal joint 67.

The upper roller 68 of the pulling unit is comparable to the lower roller 64 but is mounted on a shaft 69 with short ends journaled in floating bearings 70. These bearings 70 (FIG. 8) have vertical grooves 71 formed in their sides for mounting on guide rails 72 which stand uprightly at each end of the puller unit. The floating bearings 70 are arranged in a guideway formed between fore and aft guide rails 72 for up and down movement.

The lower ends of the guide rails 72 are secured to the channel member 42 and their upper ends are welded to angle irons which extend parallel to and above the rollers 64 and 68.

The upper ends of each set of guide rails are joined by a cap plate 73 to maintain them in parallel relation and to provide a fixed horizontal base for a compression spring 74.

The compression spring 74 is mounted on a bolt 75 which extends down through the cap plate 73. The bolt has a washer 76 mounted on it to bear against the under side of the compression spring 74. A nut 77 on the threaded lower end of the bolt 75 affords adjustment of pressure of the spring 74 to cause the bolt 75 to bear with a desired pressure against the upper surface of the floating bearing 70. In this manner the proper gripping pressure is maintained between the upper roller 68 and the lower fixed roller 64 to pull sheet material between them.

As best illustrated in FIGS. 1 and 2 the sheets S are cut longitudinally down the middle by a disc 80 mounted on the end of a lateral arm 81 having its inner extremity pivotally mounted as at 81' on the chassis 11. This is so the arm and disc can be raised and latched up out of the way when not needed.

The disc 80 and arm 81 is not needed for example on that side of the apparatus 10 where the sheet S on such side has already been halved as illustrated to the right in FIGS. 1 and 2. However, on that side where the sheet is to be cut the arm 81 is lowered so that the disc 80 thereon can cut through the sheet S. A skid bar 82 mounted on the arm 81 adjacent the disc 80 serves to maintain the hub and shaft of the disc well above the sheet S and to prevent the disc from sinking too deep into the soil. This prevents the hub and shaft of the disc from becoming snagged on the piliofilm sheet S being cut in half lengthwise.

One end of the sheet is to be fed into the apparatus by having the edge of the half sheet S closest to the apparatus pulled by hand from under the furrow f. This uncovers one corner of the half sheet which is inserted by hand through a guide ring 85 mounted on one end of a cross bar 86 mounted on the aft end of the baler 17. This guide ring 85 is thus supported directly above the furrow f or substantially so. The corner of the half sheet passes through the guide ring 85 and is fed through a guide grommet 87 formed in a plate 88 disposed at substantially right angles to the sheet as it comes from the guide ring 85. The plate 88 is mounted on arms 89 the lower ends of which are welded to the channel member 42 so that the plate 88 is parallel to although backwardly tilted relative to the pulling unit 41.

The corner of the half sheet S is then introduced between the rollers 64 and 68 by which the sheet is now ready to be pulled automatically from the field in timed relation with the progress of the apparatus along the same. The sheets S are automatically servered in lengthwise halves as the apparatus moves along.

Since the sheets S are half width (about 6 feet wide) they being very thin Pliofilm they are easily gathered into a long narrow loose strand as they pass through the guide rings 85. They are further drawn into a more compacted strand as they pass through the smaller guide grommets 87 to the rear of the puller units 41R and 41L. Finally they are pressed into a relatively flat continuous strand by the rollers 64 and 68 from whence they discharge into the upper end of the hopper 35.

Each puller unit 41R and 41L has a stripper bar 90 disposed adjacent and parallel to the lower feed roller 64. The stripper bar 90 is secured to the fore edge of the channel member 42 and leans at a slight angle downwardly from the roller 64 to guide the flattened strand of sheet material into the hopper 35.

The flat strands of material from each puller unit are guided down the rear and side walls of the hopper and through the open bottom O thereof into the chamber 18 of the baler 17.

The baler 17 has a wood block W (FIG. 4) inserted in its chamber 18. This block W fits snugly to resist pushing pressure up to a certain limit. Thus it will be seen that as the flattened strands of Pliofilm descend into the chamber 18 upon withdrawal of the piston 20 the loose strands fold up behind the piston. When the piston 20 moves rearwardly the loose pile of folded strands is first compacted. When the pile of strands is compressed sufficiently beyond the resisting friction of the wood block W against the sides, the entire pack is pushed rearwardly within the chamber 18.

Thus it will be seen that the incoming strands of sheet material are finally bundled together in neat compressed bales which ultimately are bound by bailing wires 91 stored in a tube 92 at one side of the baler 17 (right side FIG. 2). The baled sheet material is now in a well compacted, packaged condition which is easily transferred to a truck for removal and disposal. A single truck can thus handle much more yardage of the Pliofilm than was heretofore possible.

While the foregoing description is specific in detail it will be appreciated by those skilled in the art that the gathering apparatus disclosed is susceptible to modification, alteration and/or variation without departing from the spirit of our invention therein. We therefore desire to avail ourselves of all modifications, alterations and/or variations as may fairly come within the purview of the appended claims.

What we claim as new and desire to protect by Letters Patent is:

1. Apparatus for gathering Pliofilm sheets from a field over which they lie as a fumigating cover comprising a wheeled vehicle drawn along such field adjacent one edge of such sheet, a puller on said vehicle and drivingly connected to a wheel thereof for receiving one end of such sheet for pulling the same from the field, a guide ring supported at the side of said vehicle adjacent said one edge of such sheet to receive one corner of the sheet for training the sheet into a loose narrow strand as it is pulled from the field, a guide grommet mounted on said puller between the latter and said guide ring for training the loose narrow strand coming from said guide ring into a more compacted strand as it enters said puller, and means on said vehicle for collecting said sheet material therein.

2. Apparatus for gathering Pliofilm sheets from a field over which they lie as a fumigating cover comprising a wheeled vehicle having a chassis adapted to be drawn along the field adjacent one edge of such sheets, a sheet collector on said chassis, a puller on said chassis including puller rollers for receiving an end of such sheet, and means for drivingly connecting at least one of said wheels to said puller for turning said rollers to draw the sheet material from the field in timed relation with the speed of movement of said vehicle along said field, and for feeding such sheet in a flattened condition into said sheet collector.

3. Apparatus for gathering Pliofilm sheets from a field over which they lie as a fumigating cover comprising in combination a wheeled vehicle having a chassis adapted to be drawn along the field adjacent one edge of such sheets, a sheet collector on said chassis, a puller on said chassis including a pair of rollers for receiving one end of such sheet, means on said chassis between said puller and the field for guiding such sheet into a compacted strand, and means for drivingly connecting at least one wheel of said vehicle to said puller for turning the rollers thereof for drawing such sheet from the field in timed relation with the speed at which the vehicle moves therealong and for flattening the compacted strand of sheet material into a foldable flat strand and for feeding the latter into said sheet collector.

4. Apparatus for gathering Pliofilm sheets from a field on which the sheets have been laid as a fumigating cover with their edges covered by a furrow of soil comprising in combination:
 (a) a wheeled vehicle adapted to travel adjacent one edge of such a sheet,
 (b) a baler on said vehicle including a material receiving chamber, a ram and means for reciprocating the same for packing such material into bundles therein,
 (c) a guide ring supported at the side of said vehicle adjacent said one edge of such sheet to receive one corner of the sheet for training the same into a loose narrow strand,
 (d) a puller supported at the side of said vehicle above said baler for receiving said one corner of such sheet,
 (e) a guide grommet mounted on said puller between the latter and said guide ring for training the loose narrow strand of such sheet coming from said guide ring into a more compacted strand, (f) said puller including a pair of rollers for pulling the compacted strand of sheet material through said guide ring and grommet and for flattening such compacted strand into a flattened strand, and (g) means for drivingly connecting said puller rollers with at least one wheel of said vehicle for pulling such strand of sheet material from the field in timed relation with the speed of travel of said vehicle along the field and for discharging such flattened sheet into the chamber of said baler.

5. Apparatus for gathering Pliofilm sheets from a field on which the sheets have been laid in alternate rows as a fumigating cover with their edges covered by a furrow of soil comprising in combination:

(a) a wheeled vehicle adapted to travel between adjacent edges of such sheets, (b) a baler on said vehicle including a material receiving chamber, a ram and means for reciprocating the same for packing such material into bundles therein, (c) a guide ring supported at each side of said vehicle each adjacent and above one edge of an adjacent sheet to receive one corner of such sheet for training the same into a loose narrow strand, (d) a puller supported at each side of said vehicle above said baler each for receiving one of such sheets, (e) a guide grommet mounted on each of said pullers between the latter and said guide ring aft thereof for training the loose narrow strand of such sheet coming from said guide ring into a more compacted strand, (f) said pullers each including a pair of rollers for pulling the compacted strands of sheet material through the respective guide ring and grommet and for flattening such compacted strands into flattened strands, and (g) means for drivingly connecting said puller rollers with at least one wheel of said vehicle for pulling such strands of sheet material from the field in timed relation with the speed of travel of said vehicle along the field and for discharging such flattened strands into the chamber of said baler.

6. Apparatus for gathering Pliofilm sheets from a field on which the sheets have been laid as a fumigating cover with their edges covered by a furrow of soil comprising in combination:

(a) a wheeled vehicle adapted to travel adjacent one edge of such a sheet, (b) a baler on said vehicle including a material receiving chamber, a ram and means for reciprocating the same for packing such material into bundles therein, (c) a guide ring supported on said vehicle substantially above said one edge of such sheet for receiving one end thereof and for training such sheet into a loose narrow strand, (d) a puller supported on said vehicle above said baler for receiving said one end of such sheet, (e) a guide grommet mounted on said puller between the latter and said guide ring for training the loose narrow strand of such sheet material coming from said guide ring into a more compacted strand, (f) said puller including a pair of rollers for pulling the compacted strand of sheet material through said guide ring and grommet and for flattening such compacted strand into a flat foldable strand, (g) a hopper mounted on said vehicle above said baler having a discharge opening in its bottom communicating with the chamber of said baler for receiving such flat foldable sheet from said puller and for discharging the same into the chamber of said baler, and (h) means for drivingly connecting said puller rollers with at least one wheel of said vehicle for pulling such strands of sheet material from the field in timed relation with the speed of travel of said vehicle along the field.

7. Apparatus for gathering Pliofilm sheets from a field on which the sheets have been laid in alternate rows as a fumigating cover with the edges of such sheets covered by a furrow of soil comprising in combination:

(a) a wheeled vehicle adapted to travel between alternate rows of such sheets, (b) a baler on said vehicle including a material receiving chamber, a ram and means for reciprocating the same for packing such material into bundles therein, (c) means on said vehicle for cutting such sheets longitudinally into half sheets as said vehicle moves along the field, (d) a guide ring supported on each side of said vehicle each adjacent and above one edge of adjacent sheet halves to receive one corner of the half sheets for training each of them into a loose narrow strand, (e) a puller supported on each side of said vehicle above said baler for receiving such strands of the half sheets, (f) a guide grommet mounted on each of said pullers between the latter and the guide ring to the rear thereof for training the loose narrow strands into a more compacted strand as they come from said guide rings, (g) each puller including a pair of rollers for pulling the compacted strands of sheet material through said guide rings and grommets and for flattening such compacted strands into flat foldable strands, (h) a hopper mounted on said vehicle above said baler and having a discharge opening in its bottom communicating with said baler for receiving such flat foldable strands from said pullers and for discharging the same into the chamber of said baler, and (i) means for drivingly connecting said puller rollers with at least one wheel of said vehicle for pulling such strands of sheet material from the field in timed relation with the speed of travel of said vehicle along the field.

References Cited by the Examiner

UNITED STATES PATENTS

| | | | |
|---|---|---|---|
| 252,922 | 1/82 | Bacon | 100—138 X |
| 359,914 | 3/87 | Williamson | 100—138 X |
| 506,892 | 10/93 | Wiebe | 100—138 X |
| 1,293,201 | 2/19 | Rodgers | 100—180 |
| 1,819,480 | 8/31 | Paxton | 100—137 X |
| 3,024,721 | 3/62 | Brooks | 100—137 X |
| 3,110,245 | 11/63 | Kuehlman | 100—139 |

WALTER A. SCHEEL, *Primary Examiner.*